United States Patent
Tanaka et al.

(10) Patent No.: US 7,460,747 B2
(45) Date of Patent: Dec. 2, 2008

(54) WAVEGUIDE AND OPTICAL CABLE MODULE

(75) Inventors: Junichi Tanaka, Nara (JP); Hirokatsu Nakayama, Kyotanabe (JP); Naru Yasuda, Uji (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/638,155

(22) Filed: Dec. 13, 2006

(65) Prior Publication Data
US 2007/0140615 A1 Jun. 21, 2007

(30) Foreign Application Priority Data
Dec. 16, 2005 (JP) .............................. 2005-363859

(51) Int. Cl.
*G02B 6/26* (2006.01)
*G02B 6/38* (2006.01)
*G02B 6/02* (2006.01)

(52) U.S. Cl. .............................. 385/31; 385/38; 385/49; 385/70; 385/71; 385/123

(58) Field of Classification Search ........................ None
See application file for complete search history.

(56) References Cited

U.S. PATENT DOCUMENTS

| | | | | |
|---|---|---|---|---|
| 5,831,743 A | * | 11/1998 | Ramos et al. | 356/445 |
| 6,416,234 B1 | * | 7/2002 | Wach et al. | 385/70 |
| 7,057,158 B2 | * | 6/2006 | Luo | 250/227.24 |
| 7,341,384 B2 | * | 3/2008 | Chan et al. | 385/89 |
| 2002/0118917 A1 | * | 8/2002 | Kawai | 385/31 |
| 2002/0131727 A1 | * | 9/2002 | Reedy et al. | 385/88 |
| 2003/0118288 A1 | * | 6/2003 | Korenaga et al. | 385/49 |
| 2006/0029345 A1 | * | 2/2006 | Fushimi | 385/123 |

FOREIGN PATENT DOCUMENTS

JP 2004-199032 7/2004
JP 2004-302401 A 10/2004

OTHER PUBLICATIONS

Chinese Office Action issued in Chinese Application No. 2006101687581 mailed Feb. 15, 2008, 5 pages.

* cited by examiner

*Primary Examiner*—Tina M Wong
(74) *Attorney, Agent, or Firm*—Osha • Liang LLP (57) ABSTRACT

A waveguide includes a core part, clad layer surrounding the core part about an optical axis of the core part, and an optical path conversion mirror formed at the end face of at least one of the core part or the clad layer. The optical path conversion mirror converts an optical path of a signal light. The shape of the end face of the core part and the shape of the end face of the clad layer are different in the optical path conversion mirror.

9 Claims, 13 Drawing Sheets

+ Laminate after forming end face

+ Laminate after forming end face

Fig. 10

+ Laminate after forming end face

+ Laminate after forming end face

Fig. 13 PRIOR ART

WAVEGUIDE AND OPTICAL CABLE MODULE

BACKGROUND

1. Field of the Invention

The present invention relates to a waveguide and an optical cable module for optical data transmission.

2. Description of the Related Art

Optical communication networks enabling communication of large volumes of data at high speeds have been expanding in recent years. The installation of the optical communication network on consumer equipments is anticipated in the future. In particular, an optical data transmission cable (optical cable) that can be used for electrical input and output and data transmission between substrates in equipment uses a waveguide in which the core and the clad can be made of a flexible high polymer material.

The waveguide is formed by a core having a large refraction index and a clad arranged in contact with the periphery of the core and having a small refraction index, and is used to propagate the optical signal entered into the core while repeating total reflection at the boundary between the core and the clad. If the waveguide having flexibility is used as the optical cable, alignment with photoelectric conversion elements (light receiving and emitting elements) and optical coupling must be performed. The light receiving and emitting element converts the electrical signal to the optical signal and emits the optical signal, and receive the optical signal and converts the optical signal to the electrical signal. Normally, a configuration of forming an optical path conversion mirror at the end of the waveguide is often used in coupling the waveguide with the photoelectric conversion element.

Figure 12A:
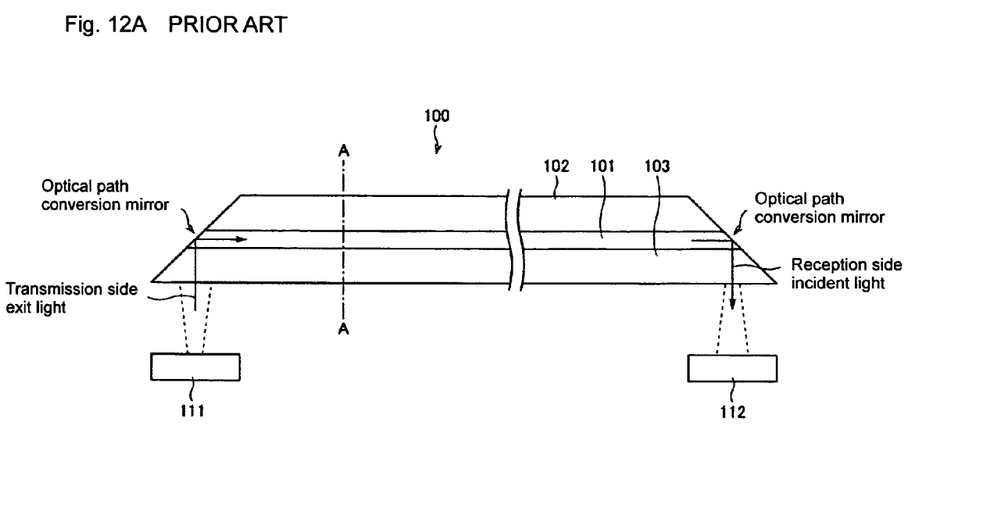
FIG. 12A shows a side view showing the waveguide including the optical path conversion mirror.
Figure 12B:
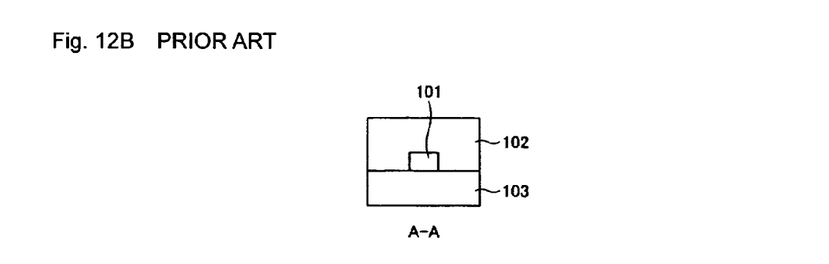
FIG. 12B shows a cross sectional view taken along line A-A of FIG. 12A.

The configuration of connecting the waveguide and the photoelectric element using the optical path conversion mirror is shown in FIGS. 12A and 12B.

A waveguide 100 shown in FIGS. 12A and 12B is configured by a core part 101, an upper clad layer 102, and a lower clad layer 103. That is, the waveguide 100 has a stacked configuration in which the core part 101 is sandwiched by the upper clad layer 102 and the lower clad layer 103. The signal light transmitted by the waveguide 100 advances through the core part 101 while being reflected at the boundary of the core part 101 and the upper clad layer 102 or the boundary of the core part 101 and the lower clad layer 103.

The optical path conversion mirror in the waveguide 100 is formed by diagonally cutting the ends of the waveguide 100 to have the ends as inclined faces. In the waveguide 100 equipped with such optical path conversion mirror, the photoelectric conversion elements, that is, the light emitting element 111 and the light receiving element 112 are arranged in a direction perpendicular to the stacking direction of the core part 101, the upper clad layer 102 and the lower clad layer 103. In FIG. 12A, the light emitting element 111 and the light receiving element 112 are arranged below the lower clad layer 103.

In the above configuration, the transmission side exit light (signal light) from the light emitting element 111 passes through the lower surface of the lower clad layer 103 and enters the waveguide 100, and is then reflected by the optical path conversion mirror to become the light that advances in the optical axis direction of the core part 101. Specifically, the signal light is reflected by the inclined face at the end of the core part 101. The signal light advanced through the core part 101 is again reflected by the optical path conversion mirror at the reception side end of the waveguide 100, and then passed through the lower surface of the lower clad layer 103 to become a reception side incident light that enters the light receiving element 112.

Figure 13:
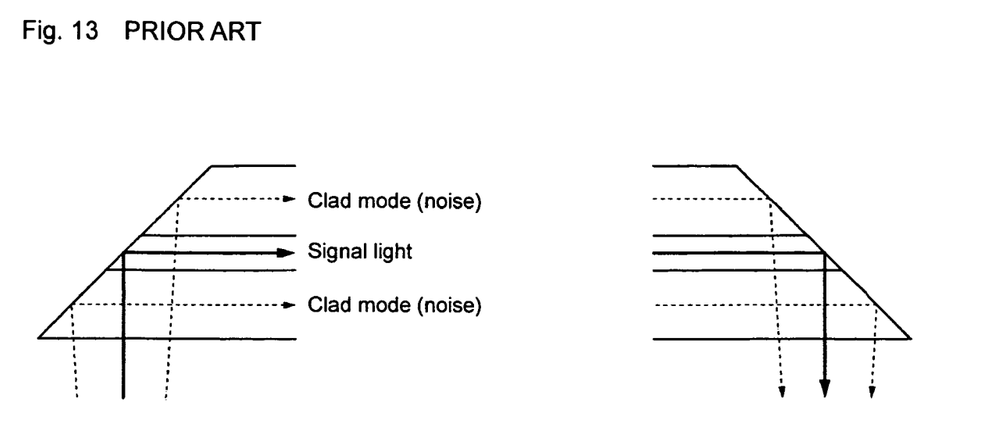
FIG. 13 shows a view explaining a clad mode that occurs in the conventional waveguide.

In the configuration shown in FIGS. 12A and 12B, the reflection at the optical path conversion mirror must occur at the ends of the core part 101 in order for the signal light to advance through the core part 101. In reality, however, some light is reflected at the end of the upper clad layer 102 or the lower clad layer 103, as shown in FIG. 13, due to diffraction and scattering of light or due to alignment shift etc. at the time of mounting. Such light advances through the clad and is transmitted from the light emitting element 111 to the light receiving element 112. The light transmitted through the clad becomes a noise referred to as clad mode, which causes the lowering of the S/N ratio of the optical signal transmitted by the waveguide. Furthermore, in the waveguide equipped with the optical conversion mirror, under the condition that the mirror is angled at 45 degrees, the exit angle of the light from the light emitting element of ±15 degrees, the core thickness of 35 μm, the upper and lower clad thickness of 50 μm, and light emitting surface distance between the lower surface of the waveguide and the light emitting element is 300 μm, about forty percent of the light emitted from the light emitting element 111 becomes the clad mode.

A high polymer waveguide disclosed in Japanese Laid-Open Patent Publication No. 2004-199032 (Published on Jul. 15, 2004) has been proposed as a technique for preventing such clad mode. In the high polymer waveguide of Japanese Laid-Open Patent Publication No. 2004-199032, black organic pigment is added and dispersed in the upper clad layer and the lower clad layer. The light that has entered the clad layer is thus absorbed by the black organic pigment and the propagation of noise is inhibited.

SUMMARY

Several embodiments of the invention include a waveguide that enhances the S/N ratio of the signal light to be transmitted without lowering the strength of the signal light and without increasing the manufacturing steps.

In accordance with one aspect of the present invention, a waveguide includes a core part, a clad layer surrounding the core part about an optical axis of the core part; and an optical path conversion mirror formed at the end face of at least one of the core part or the clad layer; wherein the optical path conversion mirror converts an optical path of a signal light; and wherein the shape of the end face of the core part and the shape of the end face of the clad layer are different in the optical path conversion mirror.

In accordance with one aspect of the present invention, an optical cable module, includes a waveguide; a light receiving element and/or light emitting element positioned at the end of the waveguide; and an electrical connecting part connected to the light receiving element and/or the light emitting element by electrical wiring; wherein the wave guide including a core part; a clad layer surrounding the core part about an optical axis of the core part; and an optical path conversion mirror formed at the end face of at least one of the core part or the clad layer; wherein the optical path conversion mirror converts an optical path of a signal light; and wherein the shape of the end face of the core part and the shape of the end face of the clad layer are different in the optical path conversion mirror.

In accordance with one aspect of the present invention, a method for manufacturing a waveguide including a core part, a clad layer surrounding the core part about an optical axis of the core part, and an optical path conversion mirror formed at the end face of at least one of the core part or the clad layer, including the steps of forming a stacked configuration including the core part and the clad layer; and forming the optical path conversion mirror at the end after forming the stacked configuration; wherein the optical path conversion mirror converts an optical path of a signal light; and wherein the shape of the end face of the core part and the shape of the end face of the clad layer are different.

In accordance with one aspect of the present invention, a method for manufacturing a waveguide including a core part, a clad layer surrounding the core part about an optical axis of the core part, and an optical path conversion mirror formed at the end face of at least one of the core part or the clad layer, including the steps of forming the end face of the core part configuring one part of the optical path conversion mirror after forming the core part; forming the end face of the clad layer configuring one part of the optical path conversion mirror after forming the clad layer; and laminating each layer of the core part and the clad layer to form the optical path conversion mirror; wherein the optical path conversion mirror converts an optical path of a signal light; and wherein the shape of the end face of the core part and the shape of the end face of the clad layer are different.

BRIEF DESCRIPTION OF THE DRAWINGS

FIG. 12 shows a conventional technique, where

DETAILED DESCRIPTION

In the conventional configuration of Japanese Laid-Open Patent Publication No. 2004-199032, the signal light is absorbed each time the signal light is reflected at the boundary of the core part and the clad layer since the black organic pigment is added to the clad layer. The transmission property of the light signal thus lowers (lowering in strength of signal light). Furthermore, a step of adding the black organic pigment to the clad layer is required, which increases the number of manufacturing steps. One configuration example of the waveguide according to a first embodiment will be described below with reference to FIG. 1.

Figure 1:
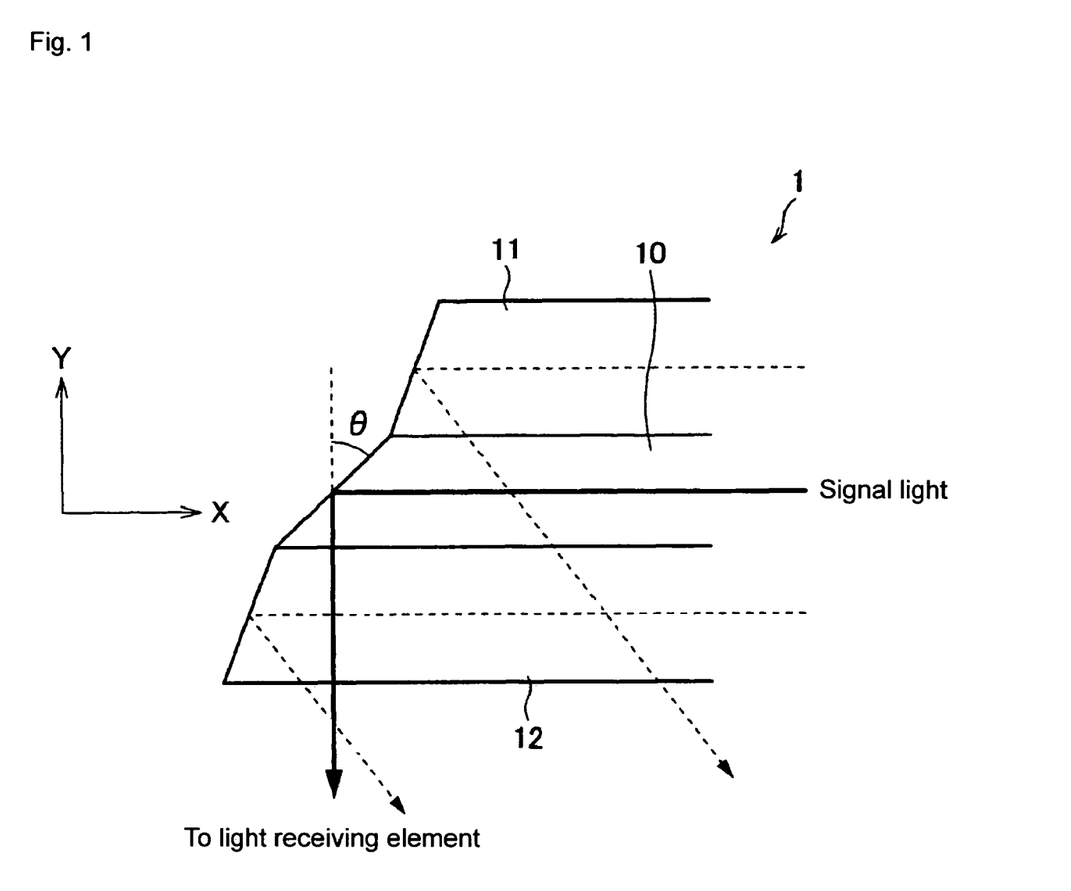
FIG. 1 shows a cross sectional view showing the shape of an optical path conversion mirror formed at the end of a waveguide according to an embodiment of the present invention.

The waveguide 1 shown in FIG. 1 is configured by a core part 10, an upper clad layer 11, and a lower clad layer 12. That is, the waveguide 1 has a stacked configuration in which the core part 10 is sandwiched by the upper clad layer 11 and the lower clad layer 12. The optical signal transmitted by the waveguide 1 advances through the core part 10 while being reflected at the boundary of the core part 10 and the upper clad layer 11 or at the boundary of the core part 10 and the lower clad layer 12. In FIG. 1, the longitudinal direction (optical axis direction) of the waveguide 1 is the X axis direction, and the stacking direction of the core part 10, the upper clad layer 11, and the lower clad layer 12 is the Y axis direction at the vicinity of the end of the waveguide 1.

In the waveguide 1, the end face of the core part 10 is not perpendicular to the optical axis (X axis), but is diagonally cut so as to form the optical path conversion mirror. Specifically, the end face of the core part 10 is perpendicular to the XY plane, and is inclined so as to form an angle θ with respect to the Y axis. Thus, the signal light (shown in solid arrow in the figure) transmitted through the core part 10 is reflected at the optical path conversion mirror at the end face of the core part 10, thereby changing the advancing direction thereof and exiting towards the light receiving element.

In the upper clad layer 11 and the lower clad layer 12 (hereinafter the upper clad layer and the lower clad layer are collectively referred to simply as clad layer), the end face angle is set so that the end faces are not parallel to the end face of the core part 10. Specifically, the end face of the clad layer is perpendicular to the XY plane, and the angle with respect to the Y axis is set so as not to be θ. The end face of the upper clad layer 11 and the end face of the lower clad layer 12 may or may not be parallel.

Thus, even if there is light (shown with broken arrow in the figure) that has transmitted through the clad layer, that light is prevented from entering the light receiving element and being detected as the noise component. That is, although the light that has been transmitted through the clad layer is reflected at the end face of the clad layer thereby changing the traveling and exiting direction thereof, the exiting direction greatly differs from that of the exit light reflected at the end face of the core part 10 since the end face of the clad layer is not parallel to the end face of the core part 10. Therefore, the light reflected at the end face of the clad layer is prevented from being detected at the light receiving element and becoming a noise.

FIG. 1 shows an exemplary waveguide wherein the end face angle of the core part 10 and the end face angle of the clad layer are different. FIG. 1 also exhibits the effect of transmitting the light (indicated with broken arrow in the figure) that has been transmitted through the clad layer without being reflected at the end face of the clad layer. In this case, the end face of the clad layer is set to an angle perpendicular to or close to an angle perpendicular to the optical axis (X axis) as in the waveguide 1' shown in FIG. 2. In other words, the inclined angle of the clad layer only needs to be smaller than or equal to the critical angle with respect to the optical axis. In this case, light that has been transmitted through the clad layer is less likely to be reflected at the end face of clad layer, most of the light passes through the clad layer, and thus the light reflected at the end face of clad layer is prevented from being detected at the light receiving element of the clad layer and becoming a noise.

Figure 2:
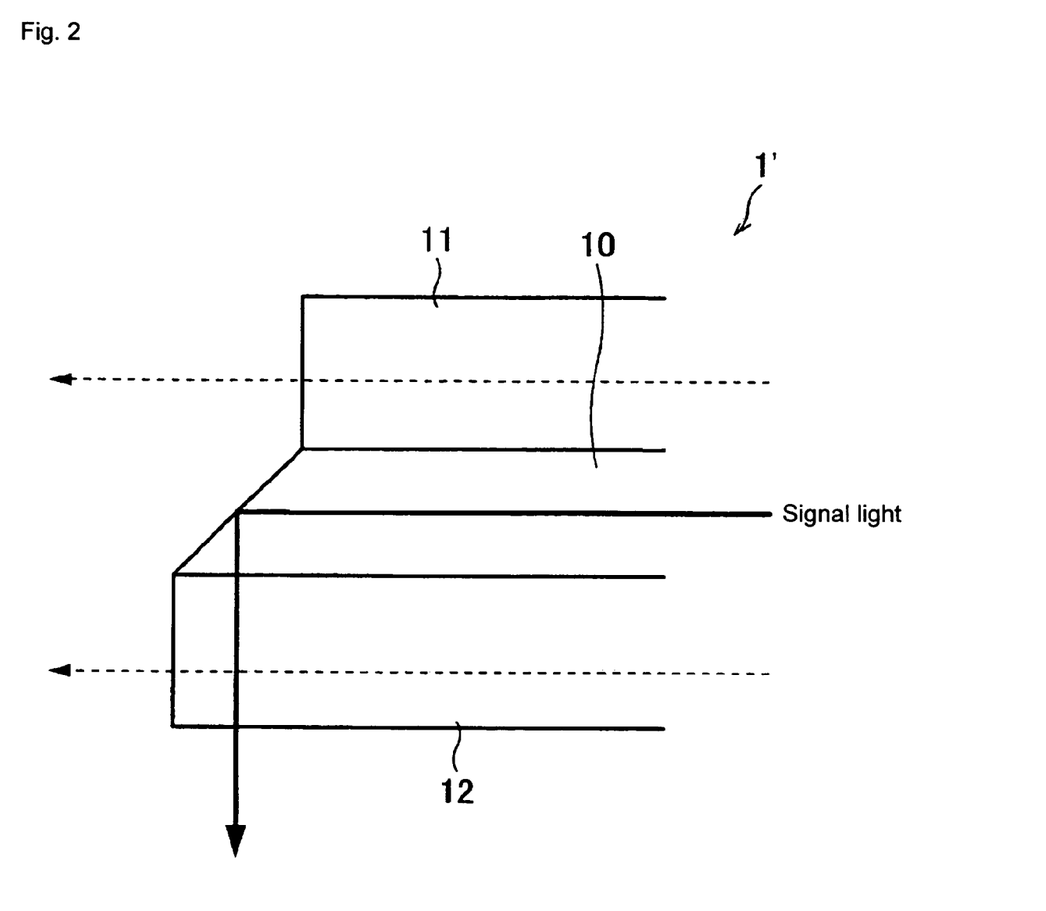
FIG. 2 shows a cross sectional view showing the shape of an optical path conversion mirror formed at the end of a waveguide according to another embodiment of the present invention.

The configuration of FIG. 2 is applicable not only to the exit side but also to the incident side of the light of the waveguide. When the configuration is applied to the incident side, the projection area of the end face of the clad layer as seen from the light emitting element side becomes smaller, and thus the light that has not entered the end face of the core part 10 from the light emitting element is also barely reflected at the end face of the clad layer. As such, the occurrence of the clad mode itself is prevented in this case. Even if the light is reflected at the end face of the clad layer, the traveling direction (of the light) after reflection greatly differs from the optical axis direction, and thus the reflected light again passes through the clad layer and exits to the outside; clad mode does not occur.

The first (waveguide 1 and the waveguide 1') embodiment shown in FIGS. 1 and 2 prevent clad mode by differing the end face angle of the core part 10 and the end face angle of the clad layer. However, it is possible to prevent clad mode by differing the shape and/or roughness of the end face of the core part and the clad layer. The configuration example of such a waveguide is shown in FIGS. 3 and 4.

Figure 3:
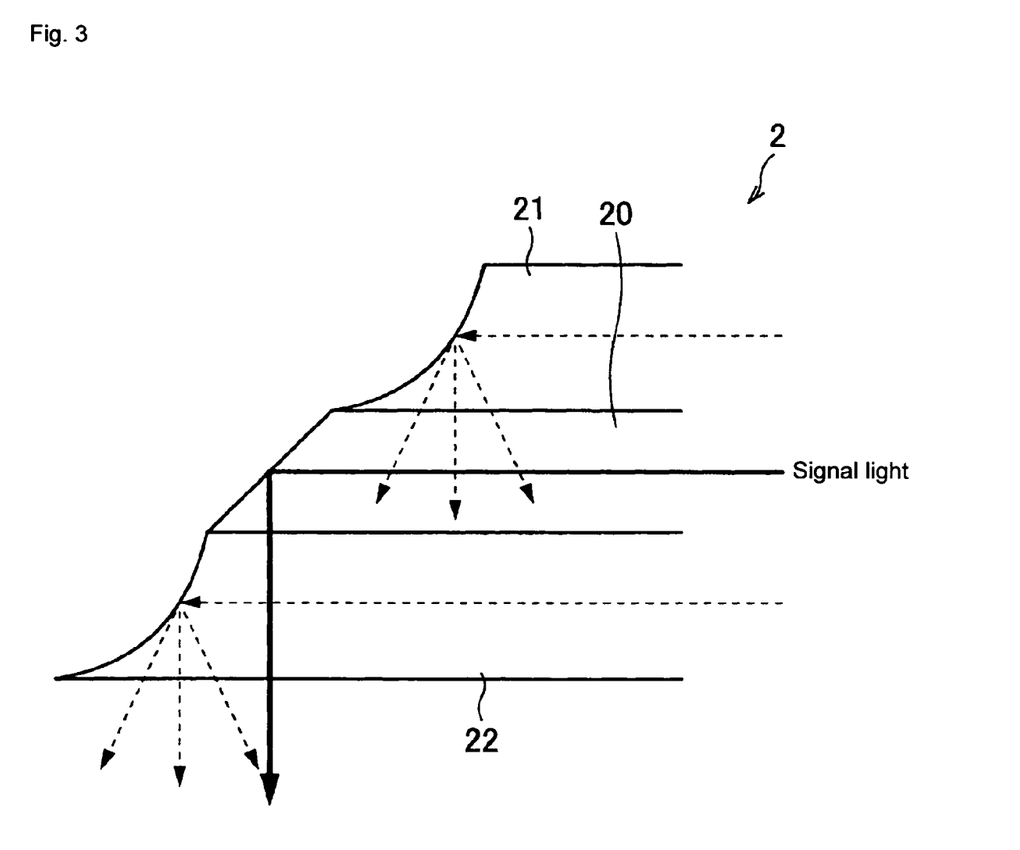
FIG. 3 shows a cross sectional view showing the shape of an optical path conversion mirror formed at the end of a waveguide according to another embodiment of the present invention.

A second embodiment (waveguide 2) shown in FIG. 3 is configured by a core part 20, an upper clad layer 21, and a lower clad layer 22. In waveguide 2, the shape of the end faces at the upper clad layer 21 and the lower clad layer 22 are configured so as to be concave faces. Light that has been transmitted through the clad layer (shown with broken arrow in the figure) is thus subjected to diffusion effect at the end face of the clad layer, substantially preventing the light reflected at the end face of the clad layer from entering the light receiving element and being detected as a noise component.

Figure 4:
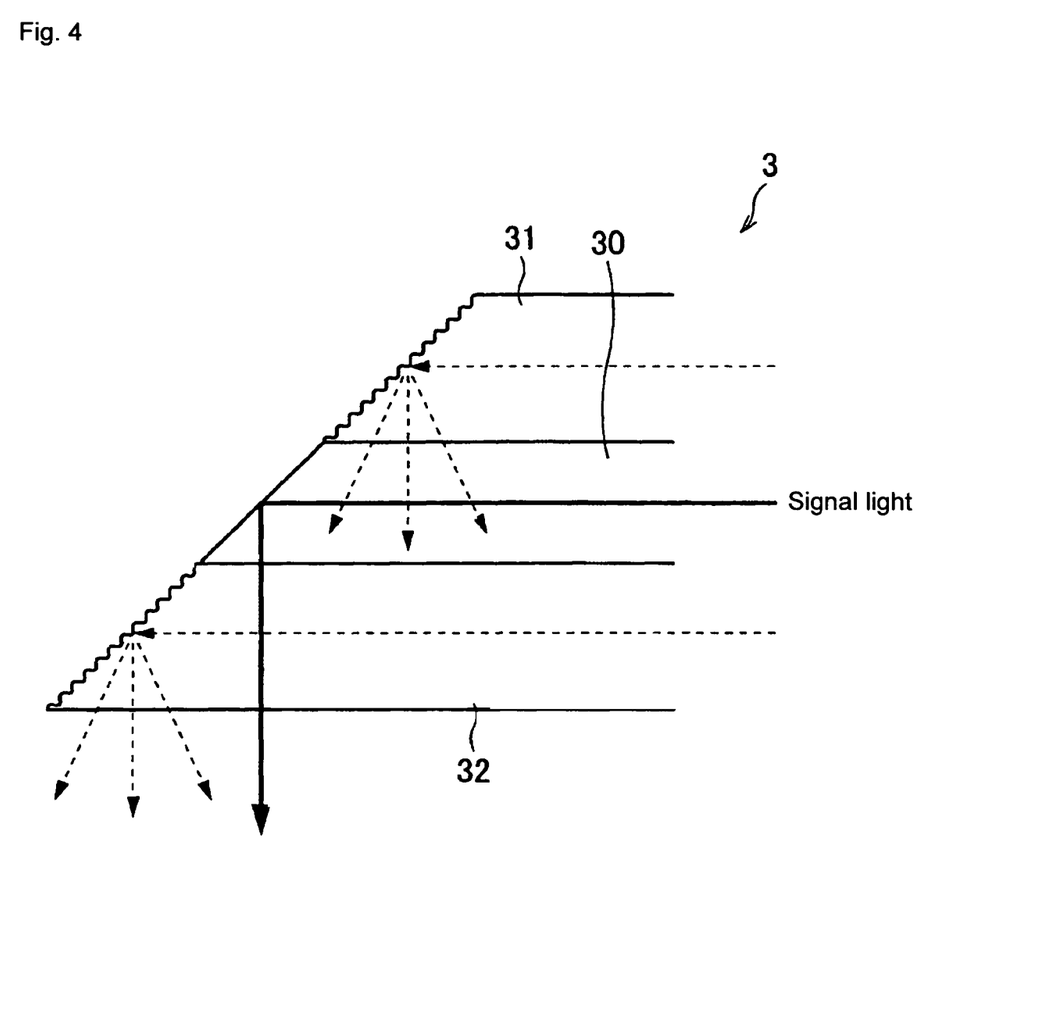
FIG. 4 shows a cross sectional view showing the shape of an optical path conversion mirror formed at the end of a waveguide according to another embodiment of the present invention.

A third embodiment (waveguide 3) shown in FIG. 4 is configured by a core part 30, an upper clad layer 31, and a lower clad layer 32. In waveguide 3, the shape of the end faces at the upper clad layer 21 and the lower clad layer 22 are configured to be rough faces. Thus, the light that has been transmitted through the clad layer (shown with broken arrow in the figure) is subjected to the scattering effect at the end face of the clad layer, substantially preventing the light reflected at the end face of the clad layer from entering the light receiving element and being detected as a noise component.

FIGS. 3 and 4 describe the exit side of the waveguide by way of example, but these effects can be obtained if such configurations are applied to the incident side of the waveguide.

The waveguides 1, 1', 2 and 3 shown in FIGS. 1 to 4 lowers the strength of the noise component created in clad mode and enhances the S/N ratio of the light signal transmitted by the waveguide by specifying the end face angle, the shape of the end face, or the end face roughness of the clad layer. However, the present invention is not limited thereto, and the strength of the signal component may be increased and the S/N ratio of the light signal transmitted by the waveguide may be enhanced by specifying, for example, the shape etc. of the end face of the core part. The configuration example of such waveguide is shown in FIGS. 5 and 6.

Figure 5:
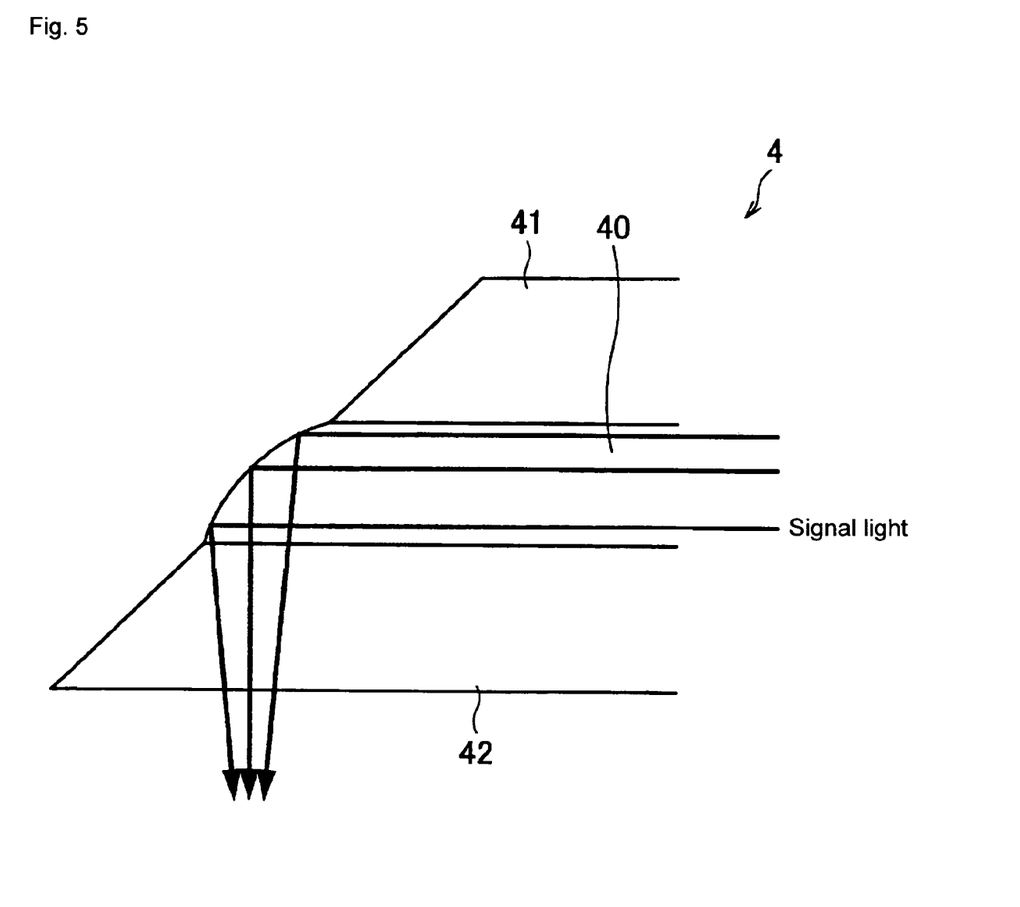
FIG. 5 shows a cross sectional view showing the shape of an optical path conversion mirror formed at the end of a waveguide according to another embodiment of the present invention.

A fourth embodiment (waveguide 4) shown in FIG. 5 is configured by a core part 40, an upper clad layer 41, and a lower clad layer 42. In the waveguide 4, the shape of the end face at the core part 40 is configured to have a convex face. Thus, the signal light that has been transmitted through the core part (shown with solid arrow in the figure) is subjected to light collection when reflected at the end face of the core part 40. Therefore, the detection amount at the light receiving element is increased with respect to the signal light transmitted through the core part 40, and the S/N ratio of the light signal is enhanced.

Figure 6:
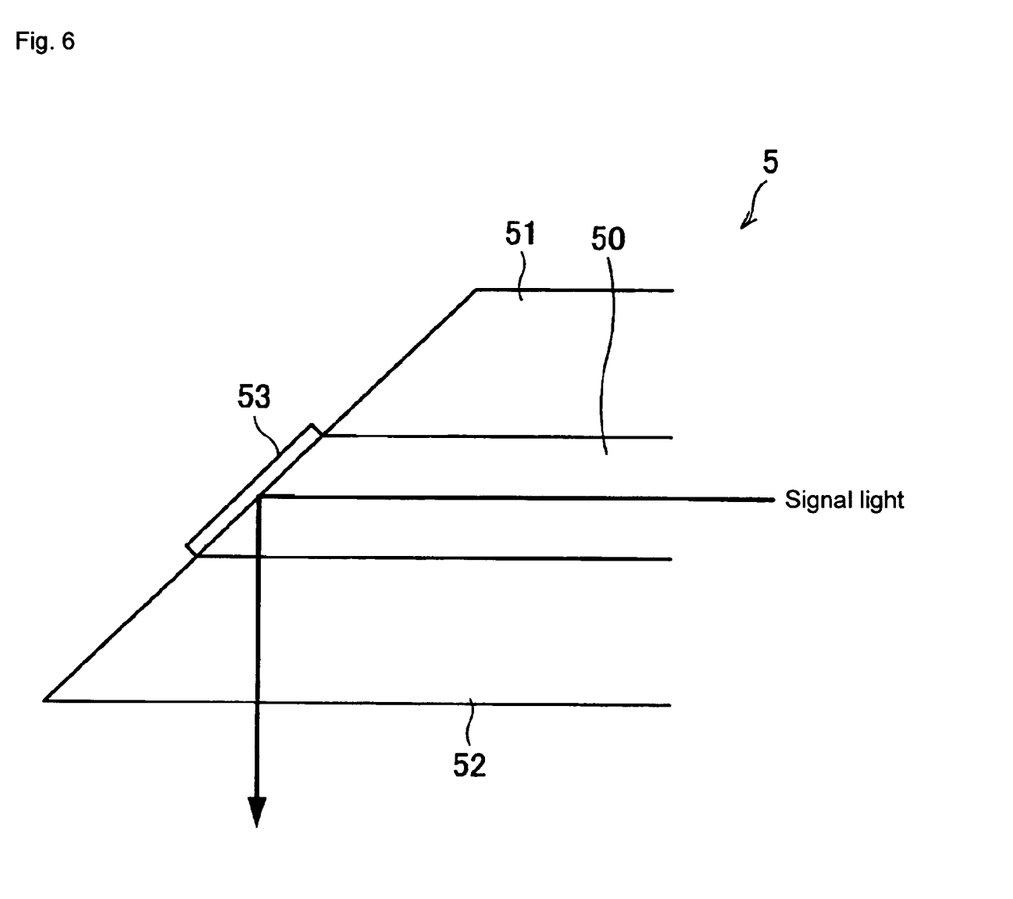
FIG. 6 shows a cross sectional view showing the shape of an optical path conversion mirror formed at the end of a waveguide according to another embodiment of the present invention.

A fifth embodiment (waveguide 5) shown in FIG. 6 is substantially configured by a core part 50, an upper clad layer 51, and a lower clad layer 52. In the waveguide 5, a reflection coating 53 is formed only at the end face of the core part 50. Thus, the light that passes through the end face at reflection at the end face of the core part 50 is eliminated from the signal light that has been transmitted through the core part 50 (shown with solid arrow in the figure), and the reflectivity at the end face of the core part 50 becomes substantially 100%. The detection amount at the light receiving element increases with respect to the signal light transmitted through the core part 50, and the S/N ratio of the light signal is enhanced.

In the above-described embodiments, the configuration of the clad layer described in FIGS. 1 to 4, and the configuration of the core part described in FIGS. 5 and 6 may be arbitrarily combined and applied to the same waveguide. For example, the configuration of FIG. 5 may be combined to the waveguide 1 shown in FIG. 1, and have the end face of the core part of FIG. 1 configured as a convex face.

Optical path conversion mirrors of different shape may be formed on the incident side and the exit side of the waveguide. Furthermore, a connecting method that does not use an optical path conversion mirror may be adopted for the connection of the waveguide and the light receiving and emitting elements, and the waveguide according to any one of several embodiments may be a waveguide including the optical path conversion mirror only at at least one end.

Therefore, a waveguide according to any one of several embodiments satisfactorily transmits the signal light between the light emitting element and the light receiving element for the signal light transmitting through the core part, and provides the effect of inhibiting the transmission at the end face of the clad layer for the light transmitting through the clad layer. That is, the relevant waveguide exhibits the effect of substantially preventing the clad mode and enhancing the S/N ratio of the signal light.

Since the light absorbing material such as black pigment etc. is not added to the clad layer, lowering the strength of the signal light, and increase in the number of manufacturing steps due in order to add the light absorbing material are avoided.

Example methods of manufacturing the waveguide according to the above-mentioned embodiments will now be described. Manufacturing a waveguide according to the presented embodiments is broadly divided into two methods.

The first method is a method of forming a stacked configuration including the core part and the clad layer, and thereafter forming the optical path conversion mirror at the end. The second method is a method of forming the shape for each layer of the core part and the clad layer, and thereafter laminating the core part and the clad layer to form the waveguide having the optical path conversion mirror conversion mirror of a predetermined shape. The first method will be described first.

A method of forming the optical path conversion mirror by cutting and a method of forming the optical path conversion mirror by tool cutting are considered when forming the waveguide according to the present embodiment with the first method. The method of forming the optical path conversion mirror by cutting will be described first.

Figure 7:
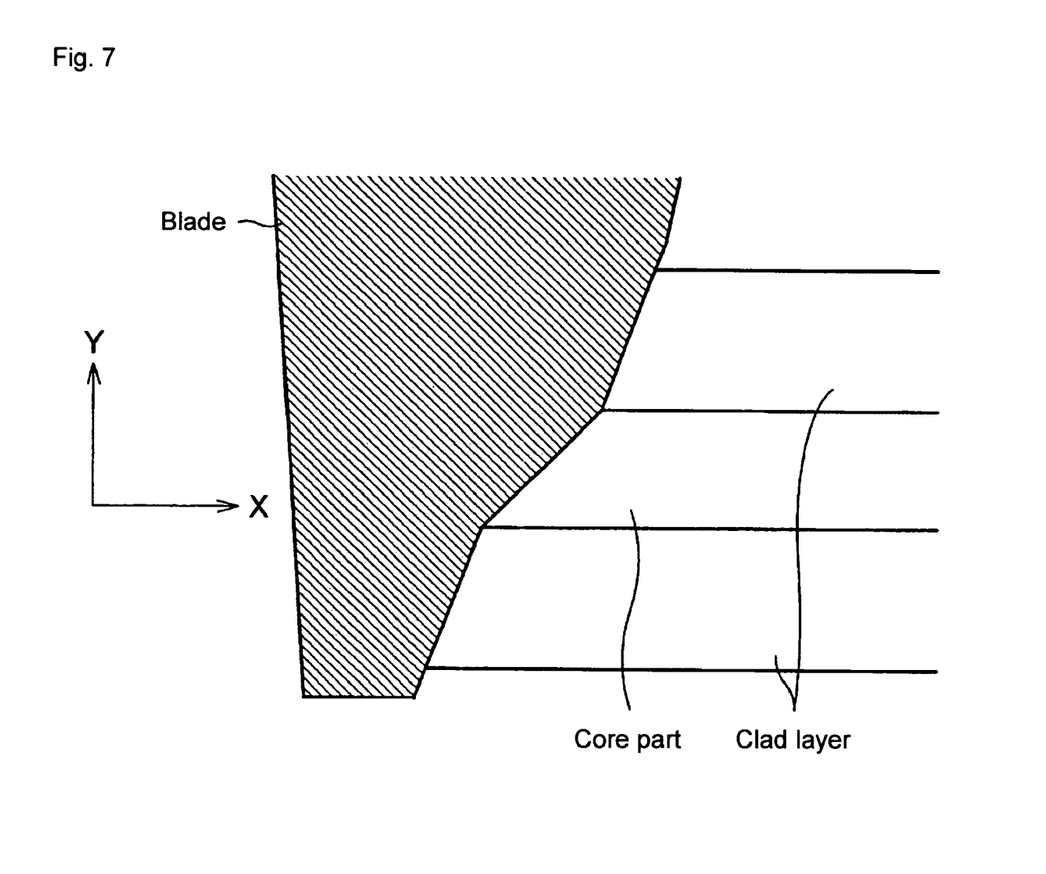
FIG. 7 shows a cross sectional view showing a method of forming an optical path conversion mirror at the end of the waveguide according to an embodiment of the present invention.

For example, when forming the optical path conversion mirror of the shape shown in FIG. 1 at the end of the waveguide, cutting is performed using a blade that matches the shape of the optical path conversion mirror desired to be formed, as shown in FIG. 7. In cutting, the blade is moved in the direction perpendicular to the XY plane while aligning the position in the Y axis direction with the positions of the core part and the clad layer.

The waveguide having the optical path conversion mirror shown in FIGS. 2, 3, and 5 can also be manufactured with a similar method by changing the shape of the blade.

Furthermore, the method of forming the optical path conversion mirror by cutting with the blade is also applicable when forming the waveguide shown in FIG. 4. However, in this case, the elasticity of the core part and the clad layer material as well as the cutting speed by the blade are the control parameters and not the shape of the blade. Specifically, the respective material is selected such that (elasticity of clad layer)>(elasticity of core part), and cutting is performed with an appropriate cutting speed to have only the end face of the clad layer as a rough face.

The method of forming the optical path conversion mirror by tool cutting according to the first method will now be described. This method is applicable when forming the optical path conversion mirror of the shape shown in FIGS. 3 and 5.

Figure 8:
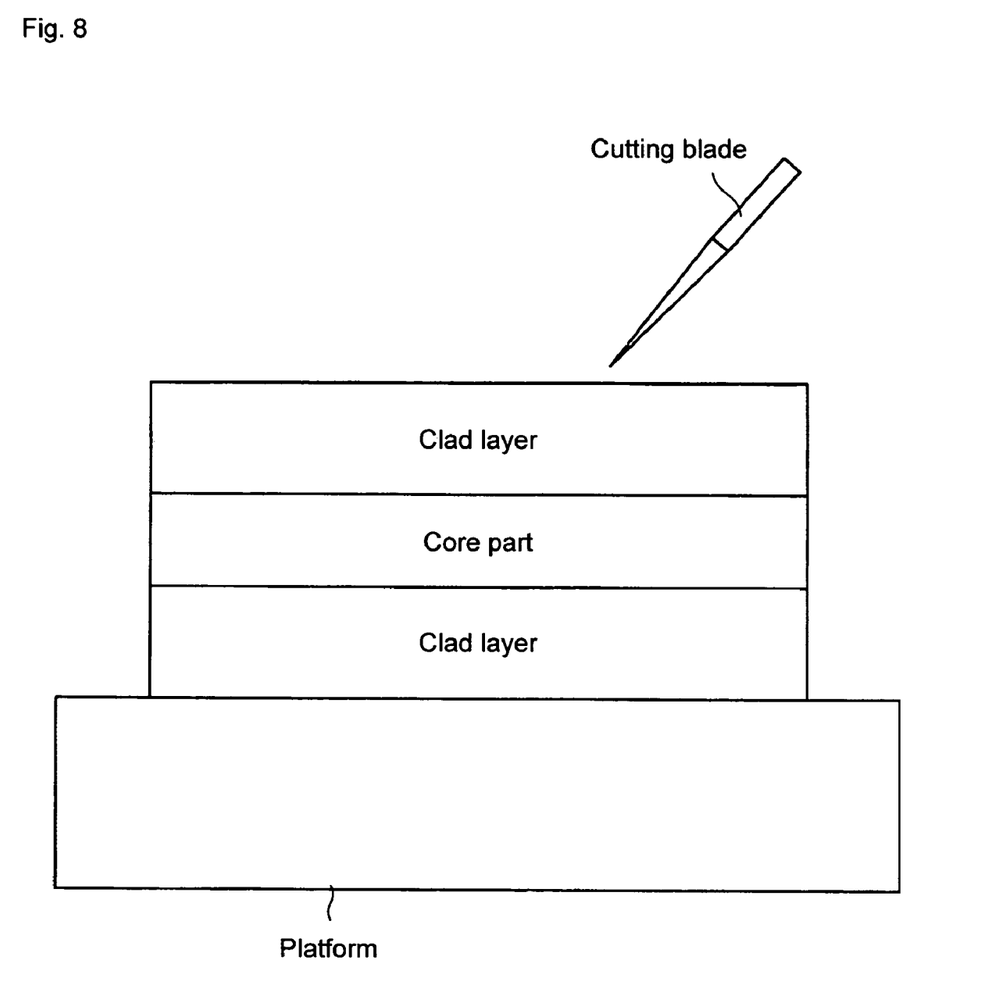
FIG. 8 shows a cross sectional view showing another method of forming an optical path conversion mirror at the end of the waveguide according to an embodiment of the present invention.

In this method, a waveguide having a stacked configuration including a core part and a clad layer is fixed on a platform, and the cutting blade is brought down in a direction inclined with respect to the platform to form the cut end face at the waveguide, as shown in FIG. 8.

In this case, the elasticity of the core part and the clad layer material becomes the control parameter. Specifically, the cut face of the clad layer becomes a concave face by selecting the respective material such that (elasticity of clad layer)>(elasticity of core part), and the optical path conversion mirror of the shape shown in FIG. 3 is formed at the end of the waveguide. Moreover, the cut face of the clad layer becomes a convex face by selecting the respective material such that (elasticity of clad layer)<(elasticity of core part), and the optical path conversion mirror of the shape shown in FIG. 5 is formed at the end of the waveguide.

A second method will now be described. In the second method of forming the end face of each layer of the core part and the clad layer individually, method by cutting, method by tool cutting, and method by etching are considered for forming the shape of the end face of each layer. The method by cutting will be described first.

Figure 9:
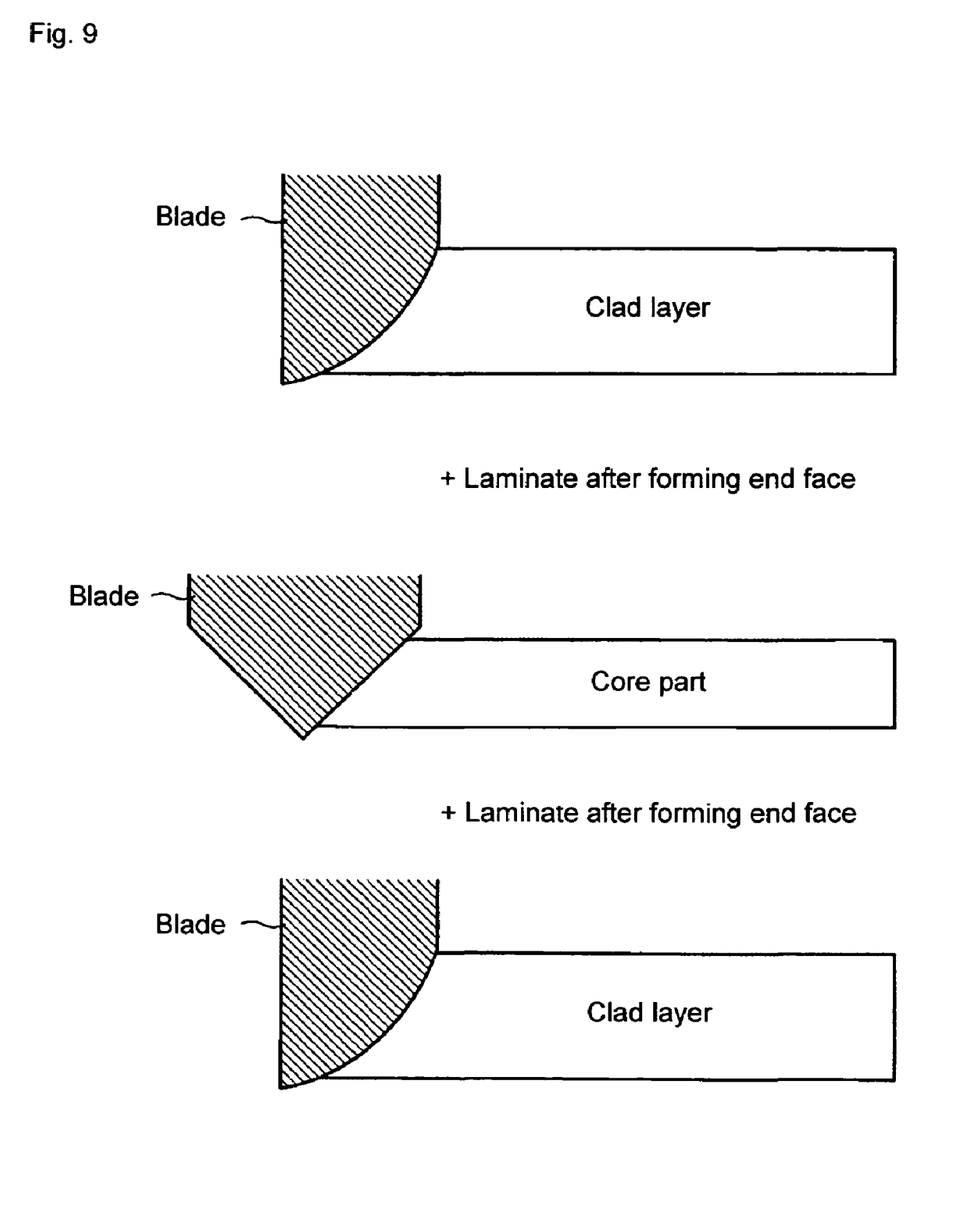
FIG. 9 shows a view showing a method of forming a waveguide having the optical path conversion mirror at the end according to an embodiment of the present invention.

When manufacturing the waveguide having the optical path conversion mirror of the shape shown in FIG. 3, for example, the end faces are formed with respect to each of the core part and the clad layer by using the blades of different shape, as shown in FIG. 9, and each layer which end faces have been formed are laminated to configure the waveguide. In this case as well, the blade is moved in a direction perpendicular to the XY plane to perform cutting.

The waveguide having the optical path conversion mirror of the shape shown in FIGS. 1, 2, 4, and 5 can also be manufactured with a similar method by changing the blade to be used.

When forming the waveguide shown in FIG. 4 with the above method, the blade grain diameter is different between the blade used in forming the end face of the core part and the blade used in forming the end face of the clad layer, where (blade grain diameter for core part)<(blade grain diameter for clad layer) to make the end face of the clad layer as a rough face. The blade grain diameter is the grain diameter of the cutting material (e.g., diamond) contained in the blade.

Alternatively, only the end face of the clad layer may be formed as the rough face by appropriately setting the elasticity of the core part and the clad layer material and the cutting speed by the blade with respect to the core part and the clad layer.

The method of etching according to the second method will now be described. This method is applicable in forming the waveguide having the optical path conversion mirror of the shape shown in FIGS. 1 to 5.

Figure 10:
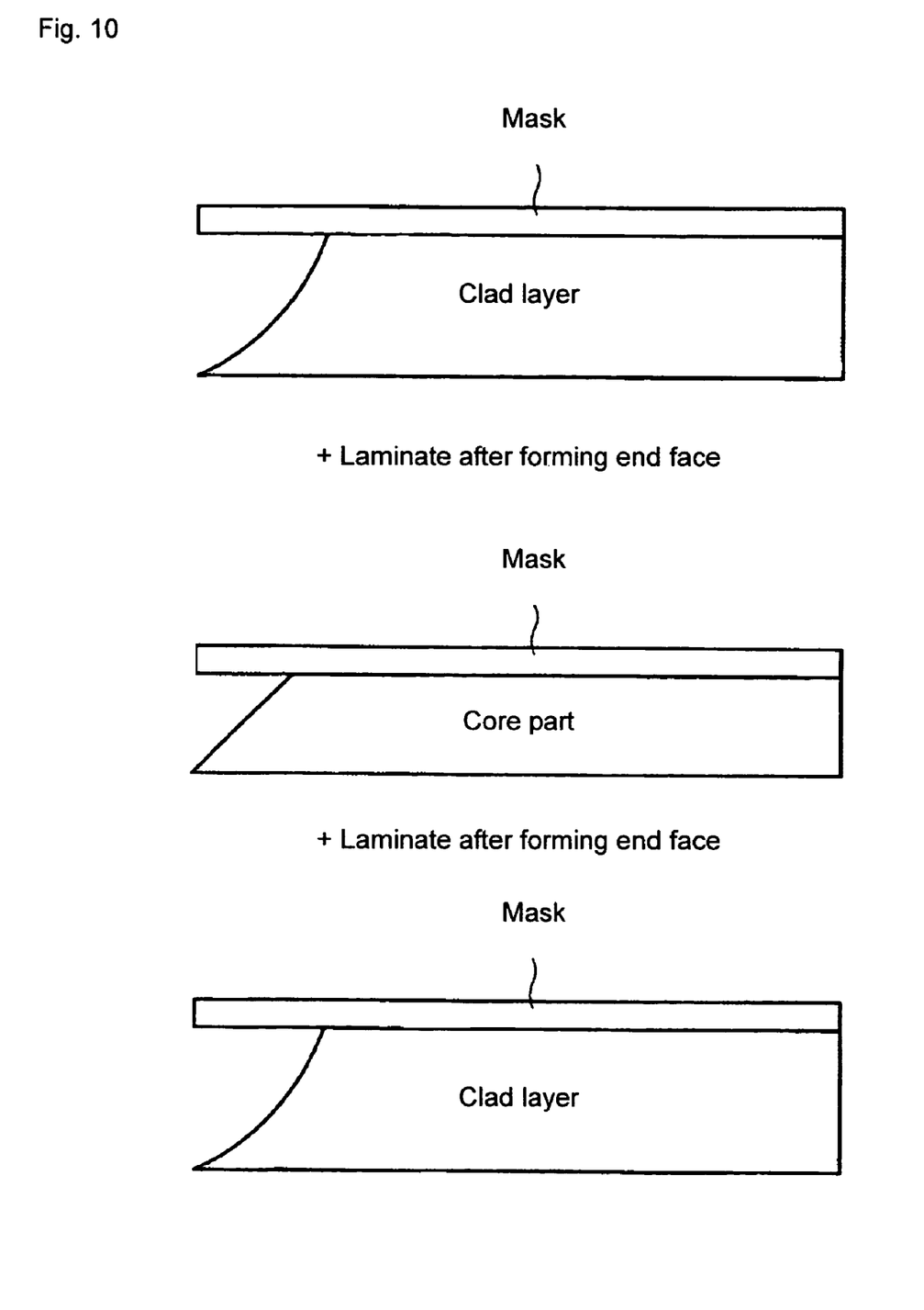
FIG. 10 shows a view showing another method of forming a waveguide having the optical path conversion mirror at the end according to an embodiment of the present invention.

When forming the end face with respect to each of the core part and the clad layer by etching, a patterned mask is formed on the upper surface of each layer, and the end face of the core part and the clad layer are formed by dry etching etc., as shown in FIG. 10.

The desired shape can be obtained at the end face of the core part and the clad layer by appropriately controlling the pressure of the etching gas and the advancing direction of the gas, whereby the waveguide having the optical path conversion mirror of the shape shown in FIGS. 1 to 3, and 5 can be formed.

The roughness of the processing face formed by etching is controlled by appropriately controlling the etch rate. That is, the end face of the clad layer is made to a rough face by appropriately setting the etch rate in the etching of the clad layer, whereby the waveguide having the optical path conversion mirror of the shape shown in FIG. 4 is formed.

The method by tool cutting according to the second method will now be described. In this method, the cut end face is formed by the cutting tool with respect to the core part and the clad layer. Since the cut end face formed by such method is a plane face, the relevant method is applicable in forming the waveguide having the optical path conversion mirror of the shape shown in FIG. 1 or FIG. 2.

Furthermore, a method of forming a metal mirror only at the core part by deposition using a mask, or a method of attaching a metal mirror piece at the end face of the core part are proposed to form a reflective coating on the optical path conversion mirror surface of the core part, as shown in FIG. 6. In the method using deposition, the metal mirror can be formed at the end face of the core part even if the end face of the core part is a convex face, as shown in FIG. 5.

Figure 11:
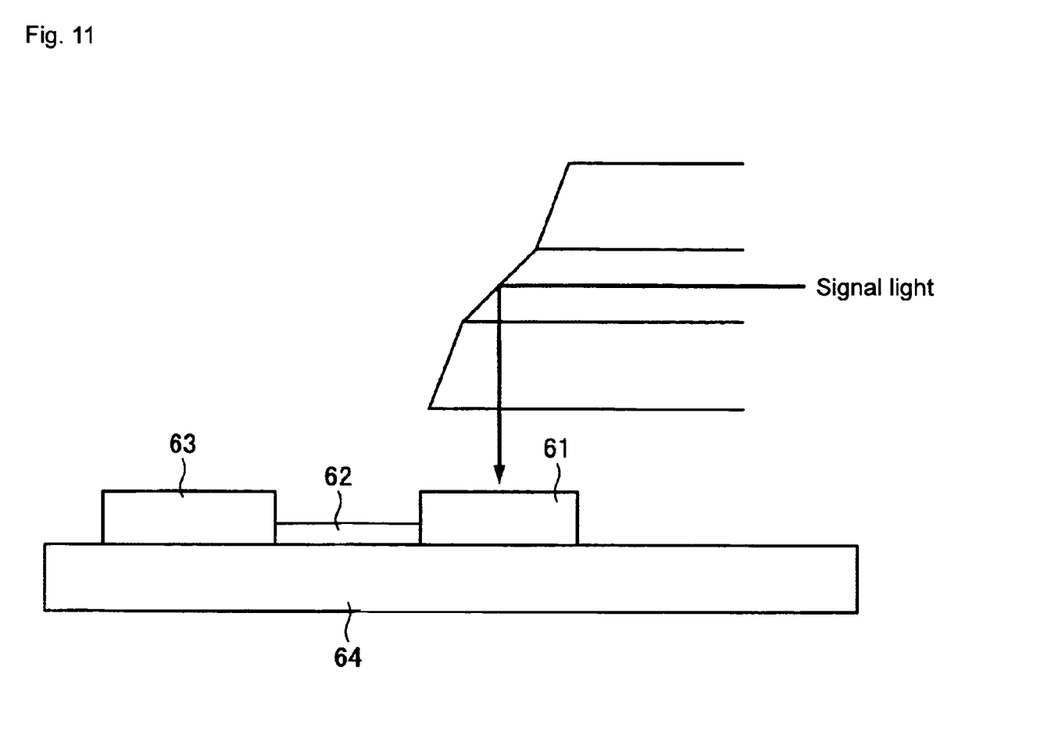
FIG. 11 shows a cross sectional view showing an optical cable module including a waveguide having the optical path conversion mirror at the end according to an embodiment of the present invention.

The waveguide according to the present embodiment configures an optical cable module by being configured including a light receiving element (or light emitting element) 61, an electrical wiring 62, an electrical connecting part (electrical connection means) 63, a substrate 64, etc. at the end, as shown in FIG. 11.

What is claimed is:

1. A waveguide, comprising:
   a core part;
   a clad layer surrounding the core part about an optical axis of the core part; and
   an optical path conversion mirror formed at the end face of at least one of the core part or the clad layer; wherein
   the optical path conversion mirror converts an optical path of a signal light; and
   the shape of the end face of the core part and the shape of the end face of the clad layer are different in the optical path conversion mirror, such that the end face of the core part reflects light toward a light receiving element and/or light emitting element fixed below the waveguide, and the end face of the clad layer reflects light toward a direction other than the light receiving element and/or light emitting element.

2. The waveguide according to claim 1, wherein the end face of the core part and the end face of the clad layer are not parallel.

3. The waveguide according to claim 1, wherein the end face of the clad layer is formed as a concave face in the optical path conversion mirror.

4. The waveguide according to claim 3, wherein the elasticity of the material used for the clad layer is greater than the elasticity of the material used for the core part.

5. The waveguide according to claim 1, wherein the surface roughness at the end face of the clad layer is greater than the surface roughness at the end face of the core part in the optical path conversion mirror.

6. The waveguide according to claim 1, wherein the end face of the core part is formed to a convex face in the optical path conversion mirror.

7. The waveguide according to claim 6, wherein the elasticity of the material used for the core part is greater than the elasticity of the material used for the clad layer part.

8. The waveguide according to claim 1, wherein a reflective coating is formed only at the end face of the core part in the optical path conversion mirror.

9. An optical cable module, comprising:
   a waveguide;
   a light receiving element and/or light emitting element positioned at the end of the waveguide; and
   an electrical connecting part connected to the light receiving element and/or the light emitting element by electrical wiring; wherein
   the wave guide comprising:
   a core part;
   a clad layer surrounding the core part about an optical axis of the core part; and
   an optical path conversion mirror formed at the end face of at least one of the core part or the clad layer; wherein
   the optical path conversion mirror converts an optical path of a signal light; and wherein
   the shape of the end face of the core part and the shape of the end face of the clad layer are different in the optical path conversion mirror, such that the end face of the core part reflects light toward the light receiving element and/or light emitting element fixed below the waveguide, and the end face of the clad layer reflects light toward a direction other than the light receiving element and/or light emitting element.

* * * * *